Feb. 6, 1934.   L. MASTRANGEL   1,946,224
TIRE GAUGE
Filed June 20, 1928
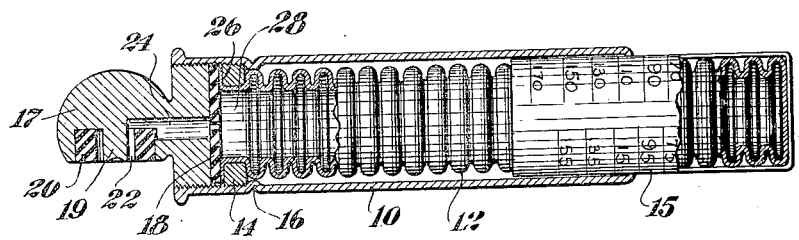
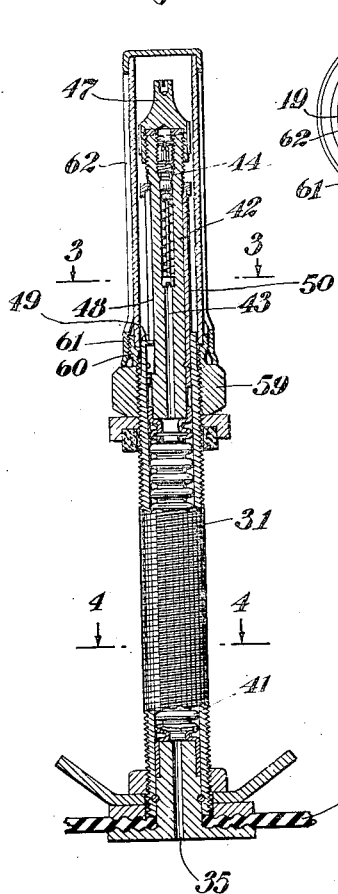
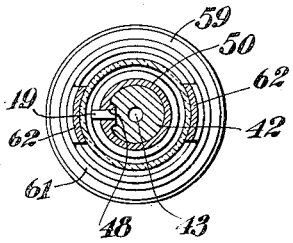
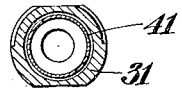
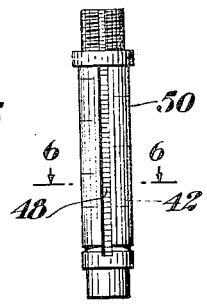
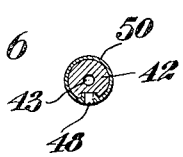
INVENTOR
Louis Mastrangel,
BY
Hammond & Littell
ATTORNEYS Patented Feb. 6, 1934

1,946,224

UNITED STATES PATENT OFFICE 1,946,224

TIRE GAUGE

Louis Mastrangel, Union City, N. J.

Application June 20, 1928. Serial No. 286,821

5 Claims. (Cl. 73—110)

This invention relates to pneumatic tire pressure gauges for measuring or indicating the pressure of air within a tire or other container, and is a continuation in part of my copending application, Serial No. 62,384, filed October 14, 1925.

It is an object of this invention to provide an improved gauge for pneumatic tires which will accurately indicate the pressure in the tire, which will be sufficiently strong and durable as to operate practically indefinitely without leakage or breakage; and by means of which only a sufficient amount of air is relieved from the tire to operate the gauge.

A further object of this invention is to provide an improved gauge for pneumatic tires which may be provided with an invariable pressure responsive element and which will be more economical than those now in use.

Another object of this invention is to provide a tire gauge in which the usual spring member is replaced by an imperforate spring bellows capable of performing the functions of the usual spring but preventing the escape of air through the gauge.

A further object of this invention is to provide an improved device for accomplishing each and all of the above objects which will be relatively simple, dependable, durable, accurate and inexpensive.

A further object of this invention is to improve and simplify the details of construction of such devices, whereby they may be more easily and inexpensively manufactured and assembled.

Various other objects and advantages of this invention will be apparent from the following description of preferred embodiments thereof together with the attached drawing in which:

Figure 1 is a longitudinal section of a tire gauge embodying the element constructed in accordance with this invention;

Figure 2 is a longitudinal sectional elevation through a combined valve stem and tire gauge;

Figure 3 is a horizontal section through a portion of tire gauge shown in Figure 2 taken on the line 3—3 thereof;

Figure 4 is a horizontal section on the line 4—4 of Figure 2;

Figure 5 is an elevation of the indicating plunger forming a part of the combined valve stem and gauge in Figure 2;

Figure 6 is a horizontal section on the line 6—6 of Figure 5.

The tire gauge shown in Figure 1 comprises a metallic casing 10 substantially cylindrical in cross section and forming a cover or container for the enclosed metallic bellows 12. This metallic bellows which forms the essence of this invention takes the place of the usual rubber or helical coil element and is so constructed that it may normally expand and contract in accordance with slight variations in air pressure. This bellows 12 is fitted over and attached to a ring or collar 14 which is screw threaded into the lower end of the casing 10. The bellows 12 preferably consists of a sleeve of thin ductile metal having circular or peripheral corrugations spun at longitudinal spaced points therein. The entire sleeve is then compressed endwise to flatten the corrugations to a considerable extent. Such a sleeve when subjected to an internal pressure will distend or expand without rupture and therefore may be advantageously used for indicating the variations in pressure.

The other end of the bellows 12 is fitted within a plunger 15 and may be secured thereto in any usual manner. The outer end or the extensible end of the bellows 12 is sealed either by being formed in a sealed manner or by being closed by the outer end of the plunger 15. The plunger 15 will be suitably marked to indicate the expansion which is proportionate to the amount of pressure within the bellows. These markings may be calibrated to correspond with the pressure in the tire so that the instrument may be direct reading.

The open end of the instrument, as before stated, is provided with a collar or ring 14 which is screw threaded in the end of the casing 10, abutting against the depression 16. This merely limits the inward movement of the collar as the bellows element 12 is positively secured to the ring and may be removed when desired. An annular fitting or base member 17 is also screw threaded into the end of the casing 10 against a fiber washer 18 to form an air tight contact with the end flange 26 of the bellows. The fitting 17 is provided with a central projection 19 at right angles to the casing 10 and this projection 19 is adapted to contact with the usual plunger in a tire valve. The gauge will be brought into contact with the base of the usual tire valve stem by means of the rubber washer 20 which is spaced from the projection 19 providing a passage way 22 which is in communication with the passage way 24 at right angles thereto through the perforation in the washer 18 and thence into the interior 28 of the bellows 12, the projection 19 acting to depress the tire valve.

The operation of this device will now be apparent. The plunger 15 in its normal position will be within the limits of the casing 10 and when it is desired to determine the pressure in any tire or in fact any reservoir which is provided with the common form of tire valve the annular fitting 17 will be placed in contact with such tire valve, the projection 19 depressing the plunger therein and permitting the air pressure to reach the inside of the bellows 12 which will force the plunger 15 from the casing 10 in proportion to the pressure. By directly reading the calibrated pressures on the plunger 15, the extent of the pressure in the reservoir or tire may be quickly determined. The rubber washer 20 in contact with the sides of the tire valve will prevent escape of air and the imperforate metallic bellows will likewise prevent any loss of air other than that necessary to operate the gauge. The metal will work efficiently and yet not be subject to deterioration, cracking, loss of resiliency or other conditions which tend to make the ordinary tire gauge inaccurate after a short period of use.

A modification of the device in which the bellows may be used in tire valve stem gauges is shown in Figures 2 to 6 inclusive in which valve stem 31 is shown attached to the wall of the inner tube 38 of a tire by the usual spreaders and lock nuts and a central air passage in base member 35 is provided to permit fluid communication with the interior of the tire and the interior of the bellows 41 which fits within the valve stem 31. The lower end of the bellows or accordion spring 41 is secured to the end of the bas member 35 in both an airtight and immovable manner.

At the other end of the valve stem, a movable indicating plunger 42 is secured in an airtight manner to the end of the bellows 41, and is provided with a central air passage 43 and valve mechanism 44 through which air may be forced into the tire 38. A valve cap 47 may also be provided for the top of the plunger.

The plunger as shown in Figure 5 may preferably be provided with an indicating sleeve or shell 50 on which the calibrations of pressure will be made and it may also have a groove 48 cooperating with a tongue 49 on the valve stem to permit longitudinal movement of the plunger in the valve stem but prevent relative rotation thereof. This shell 50 may be attached to the plunger in any preferred manner and the groove therein will also limit the external movement of the plunger to prevent undue extension thereof.

A protecting cap or shell 61 is screwed or otherwise removably attached to the screw threaded portion 60 of the cap base 59 which is usually provided with the dust cover. The shell 61 is provided with windows 62 which may be slits in the cap and with a transparent material such as celluloid therein. These windows permit observation of the calibrations on the plunger at all times and the protecting shell may be removed at will.

The operation of this form of the device is as follows:

The plunger being attached to the upper end of the bellows or accordion spring will be forced to move up or down in accordance with variations in the pressure of the air within the tire. This movement will change the relative location between the characters on the plunger and the side of the valve stem and from this, the pressure in the tire may be read in suitable units at all times. This reading is always available as the numerals may be read through the transparent casing or shell. If it is desired to put more air in the tire or to deflate it, the protecting casing 61 may be removed exposing the usual and common tire valve mechanism which is on the end of the plunger.

As before mentioned, the use of the bellows or accordion shaped metallic spring, which is constructed from a single piece of metal permits greater wear and use, is not subject to deterioration, may be correctly calibrated, will last indefinitely and will be invariable in correctly showing the pressure within the tire or other reservoir to which attached whether it be temporary as in the first form or permanent as shown in the second.

While I have shown two preferred forms of embodiment to which my invention is adapted, I know that other modifications may be made and I desire protection on the broad spirit and scope of the invention as disclosed herein and claimed hereinafter.

I claim:

1. An improvement in tire pressure gauges of the type described comprising a cylindrical casing, a base member substantially closing one end of said casing, and having a passage to communicate air pressure through the base member, a plunger slidably mounted in the other end of the casing, an expansible and self contractible metal bellows within said casing and secured at one end of the base member and having its other end attached to the plunger, whereby the plunger will be moved longitudinally in the casing upon contraction and expansion of the bellows.

2. In a pressure gauge of the type described, pressure indicating means to be moved a distance by fluid pressure communicated thereto, said means including a plunger adapted to move a distance proportional to the pressure, calibrated to read the distance which the plunger has moved in terms of pressure, a flexible metallic accordion or bellows attached to said plunger, a fitting for attachment to the pressure source having a passage leading to said flexible element, said flexible element being formed of ductile sheet metal and expansible in a longitudinal direction only and being self-collapsing on failure of pressure.

3. An improvement in pressure gauges for tires comprising a base having a passage to permit pressure on the inside of a tire to act therethrough, a metallic tube fixedly attached at one end adjacent said base and in pressure tight relation therewith, said tube being closed at the other end, said tube having transverse corrugations forming a bellows which is expansible and self-contractible to indicate the degree of pressure in the tire, a tubular plunger capping the closed end of the bellows and bearing indications to denote the degree of pressure in the tire, said plunger being secured to said bellows and automatically moving with said bellows on failure of pressure, and a casing attached to the base and encircling the tube and the plunger and being open at its end farthest from the base to permit the plunger to project therethrough.

4. An indicating pressure gauge of the expansion type comprising a tubular casing, a flexible metallic element mounted within said casing, said element being of bellows shape and inherently adapted to uniformly expand and self-contract, an attachment fitting for communicating pressure from a pressure source to said element without loss of pressure and a tubular member secured to one end of said flexible element adapted to telescope within said casing and permit free movement of one end of said element in and out of said casing said tubular member having indicating insignia thereon to directly indicate the extent of movement of said element out of said casing and the pressure equivalent thereto, said attachment fitting being adapted to communicate air pressure from a pneumatic tire valve whereby the air pressure within the tire may be determined without loss of pressure, the open end of said tubular casing cooperating with said pressure indications and adapted to act as an indicator for said readings.

5. A tire pressure gauge, of the class described, comprising a cylindrical casing, a metallic bellows secured at one end in said casing and adapted to move with respect to said casing, an indicating element cooperating with the movable end of said bellows, means to conduct air pressure within said bellows, said bellows being adapted to uniformly expand and contract with variations of pressure, said bellows contracting solely due to its inherent construction on the failure of pressure, said indicating element and said first mentioned casing cooperating to directly indicate equivalent pressure in said tire.

LOUIS MASTRANGEL.